(12) United States Patent
Yamakawa et al.

(10) Patent No.: US 11,472,359 B2
(45) Date of Patent: Oct. 18, 2022

(54) STRUCTURAL MEMBER FOR VEHICLE

(71) Applicant: KOBE STEEL, LTD., Hyogo (JP)

(72) Inventors: Taiki Yamakawa, Kobe (JP); Toru Hashimura, Kobe (JP); Yasuhiro Maeda, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 154 days.

(21) Appl. No.: 16/977,456

(22) PCT Filed: Feb. 4, 2019

(86) PCT No.: PCT/JP2019/003807
§ 371 (c)(1),
(2) Date: Sep. 1, 2020

(87) PCT Pub. No.: WO2019/176371
PCT Pub. Date: Sep. 19, 2019

(65) Prior Publication Data
US 2020/0406844 A1 Dec. 31, 2020

(30) Foreign Application Priority Data

Mar. 14, 2018 (JP) .............................. JP2018-046935

(51) Int. Cl.
*B60R 19/26* (2006.01)
*B60R 19/18* (2006.01)
*B60R 19/02* (2006.01)

(52) U.S. Cl.
CPC ............ *B60R 19/26* (2013.01); *B60R 19/023* (2013.01); *B60R 19/18* (2013.01); *B60R 2019/1806* (2013.01)

(58) Field of Classification Search
CPC ............ B60R 19/18; B60R 2019/1806; B60R 19/023; B60R 19/26
See application file for complete search history.

(56) References Cited

U.S. PATENT DOCUMENTS 7,896,408 B2* 3/2011 Hashimoto ............. B60R 19/24
293/120
9,156,416 B2* 10/2015 Bryer ...................... B60R 19/26
(Continued)

FOREIGN PATENT DOCUMENTS

| JP | 2009-241869 A | 10/2009 |
| JP | 2010-018047 A | 1/2010 |

(Continued)

OTHER PUBLICATIONS

International Search Report issued in PCT/JP2019/003807; dated May 7, 2019.

(Continued)

*Primary Examiner* — D Glenn Dayoan
*Assistant Examiner* — Melissa Ann Bonifazi
(74) *Attorney, Agent, or Firm* — Studebaker & Brackett PC

(57) ABSTRACT

A structural member for a vehicle includes bumper stays having a tubular configuration and fixed to each of front ends of a pair of front side members included in a vehicle, and a tubular bumper beam provided with holes and into which the bumper stay is inserted. Each of the bumper stays includes a first shock absorbing portion and a second shock absorbing portion provided adjacent to the first shock absorbing portion on an outer side.

5 Claims, 8 Drawing Sheets

(56) References Cited

U.S. PATENT DOCUMENTS

2009/0243314 A1  10/2009  Hashimoto et al.
2014/0008923 A1   1/2014  Han et al.
2017/0151919 A1   6/2017  Kashiwagi et al.

FOREIGN PATENT DOCUMENTS

JP    2017-100555 A    6/2017
KR    10-1316876 B1   10/2013

OTHER PUBLICATIONS

Notification of Transmittal of Translation of the International Preliminary Report on Patentability and Translation of Written Opinion of the International Searching Authority; PCT/JP2019/003807; dated Sep. 24, 2020.

* cited by examiner

STRUCTURAL MEMBER FOR VEHICLE

CROSS-REFERENCE TO RELATED APPLICATIONS

This is a national phase application in the United States of International Patent Application No. PCT/JP2019/003807 with an international filing date of Feb. 4, 2019, which claims priorities of Japanese Patent Applications 2018-046935 filed on Mar. 14, 2018 the contents of which are incorporated herewith by reference.

TECHNICAL FIELD

The present invention relates to a structural member for a vehicle.

BACKGROUND ART

In recent years, a high collision safety is demanded for a structural member for a vehicle for shock absorption, in such a manner that a small overlap collision test is introduced.

As a conventional structural member for a vehicle for shock absorption, there is one including a shock absorbing member protruding from a front side frame provided on both sides of a vehicle body toward the front of the vehicle body, and a bumper beam connected to a front end portion of the shock absorbing member and extending in a vehicle width direction (see JP 2017-100555 A). JP 2017-100555 A discloses a structural member for a vehicle including a shock absorbing portion that projects outward in the vehicle width direction in order to increase an absorption amount of shock energy at the time of a small overlap collision. Further, in this structural member for a vehicle, the shock absorbing portion and the bumper beam are joined by welding.

SUMMARY OF THE INVENTION

However, in the structural member for a vehicle of JP 2017-100555 A, since the shock absorbing member and the beam are joined by welding, softening or thermal strain occurs in a weld heat affected zone, and the reliability as a structural member for a vehicle may be lowered.

An object of the present invention is to provide a structural member for a vehicle that can improve energy absorption efficiency at the time of a small overlap collision without lowering reliability.

A structural member for a vehicle according to an aspect of the present invention includes bumper stays having a tubular configuration and fixed to each of front ends of a pair of front side members of a vehicle, and a tubular bumper beam provided with holes to which the bumper stays are inserted. Each of the bumper stays includes a first shock absorbing portion having an insertion portion joined to the bumper beam at one of the holes in expanded state; and a second shock absorbing portion provided outwardly and adjacently with respect to the first shock absorbing portion.

According to this configuration, at the time of a small overlap collision, the second shock absorbing portion in addition to the first shock absorbing portion of the bumper beam collapses in a direction in which the bumper stay extends. In this manner, energy absorption efficiency at the time of a small overlap collision can be improved. Further, the bumper beam and the bumper stay are joined by expansion of the bumper stay. That is, welding is not required to join the bumper beam and the bumper stay, and the reliability of the structural member for a vehicle is not reduced.

The first shock absorbing portion may be fixed to the front side member, and the second shock absorbing portion of the bumper stay may extend outwardly with respect to the front side member.

According to this configuration, regardless of a mounting position of the bumper stay on the front side member of a vehicle, the second shock absorbing portion can increase an absorption amount of impact energy at the time of a small overlap collision. Further, even in a case where the dimension in a vehicle width direction of the bumper beam is increased, the impact energy of a section from an end portion in the vehicle width direction of the bumper beam to the first shock absorbing portion of the bumper stay is absorbed by the second shock absorbing portion of the bumper stay, so that the structural member for a vehicle does not fall sideways at the time of a small overlap collision.

The first shock absorbing portion and the second shock absorbing portion of the bumper stay may have a closed cross-sectional shape in a cross section orthogonal to a direction in which the bumper stay extends.

According to this configuration, as compared with a case where the first shock absorbing portion of the bumper stay has an open cross section in the cross section orthogonal to a direction in which the bumper stay extends, a bonding force between the bumper stay and the bumper beam can be improved. Further, as compared with a case where the second shock absorbing portion of the bumper stay has an open cross section in the cross section orthogonal to the direction in which the bumper stay extends, a cross-sectional area of the entire bumper stay can be made large, and an absorption amount of impact energy can be increased.

A cross section of the bumper stay orthogonal to a direction in which the bumper stay extends may include a first octagonal portion and a second octagonal portion disposed adjacent to the first octagonal portion, and the first octagonal portion and the second octagonal portion may share one partition wall.

According to this configuration, a bumper stay in which energy absorption efficiency at the time of a small overlap collision can be improved without lowering reliability can be specifically designed.

The bumper beam may include an opposed wall opposite to an end portion of the second shock absorbing portion in a direction in which the bumper stay extends, and the end portion of the second shock absorbing portion and the opposed wall of the bumper beam may be disposed at an interval in a direction in which the bumper stay extends.

According to this configuration, at the time of a small overlap collision, the first shock absorbing portion is collapsed in the direction in which the bumper stay extends, and then the second shock absorbing portion is collapsed in the direction in which the bumper stay extends. That is, since the impact at the time of a small overlap collision can be absorbed in a stepwise manner, an initial load acting on the bumper stay can be prevented from rising significantly at an initial stage of the collision.

A dimension of the bumper beam in a vehicle width direction may be larger than 85% of a vehicle width of the vehicle, and a dimension of the bumper stay in the vehicle width direction may be larger than 17.5% of the vehicle width of the vehicle.

According to this configuration, for example, in a case where an overlap collision of 25% of the vehicle width is applied to a vehicle, the bumper stay can absorb impact of an area of 70% of the collision area in the vehicle width direction.

According to the present invention, energy absorption efficiency at the time of a small overlap collision can be improved without lowering reliability.

MODE FOR CARRYING OUT THE INVENTION

Hereinafter, an embodiment of the present invention will be described with reference to the accompanying drawings.

First Embodiment

Figure 1:
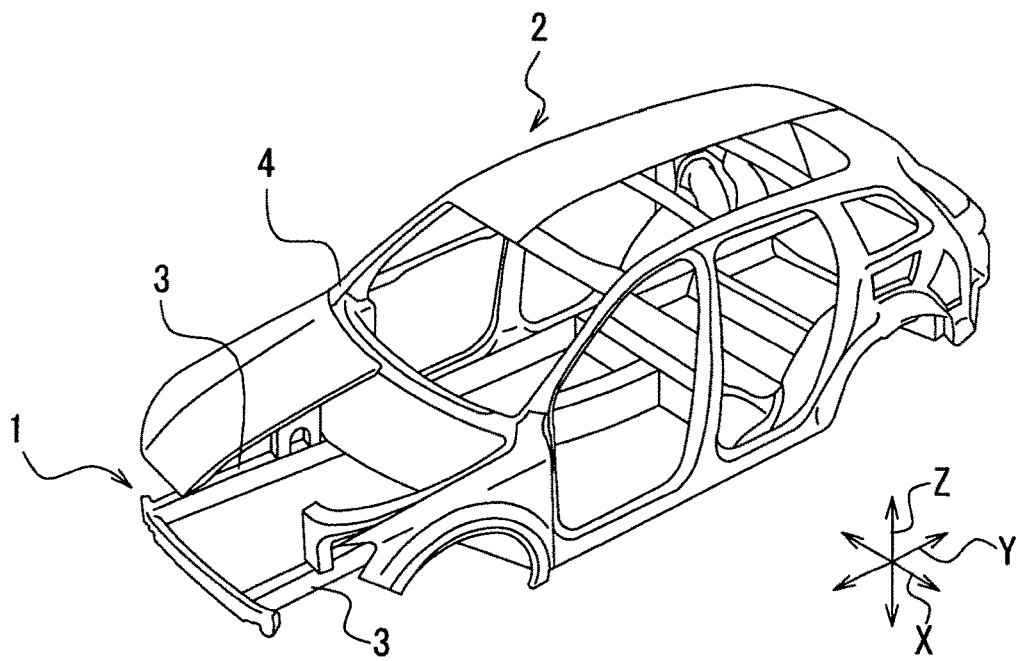
FIG. 1 is a schematic perspective view of a vehicle body frame to which a structural member for a vehicle according to a first embodiment of the present invention is attached.

FIG. 1 is a schematic perspective view of an automobile (vehicle) 2 to which a bumper reinforcement (structural member for a vehicle) 1 of the present invention is attached. In description below, a vehicle width direction, a front-back direction, and a vehicle height direction of the automobile 2 may be referred to as an X direction, a Y direction, and a Z direction, respectively.

Referring to FIG. 1, the automobile 2 includes a pair of front side members 3 extending in the Y direction on both sides in the X direction of the automobile 12. The bumper reinforcement 1 is attached so as to be bridged between a pair of the front side members 3. The bumper reinforcement 1 plays a role of protecting a main body 4 of the automobile 2 in the case of a frontal collision.

Figure 2:
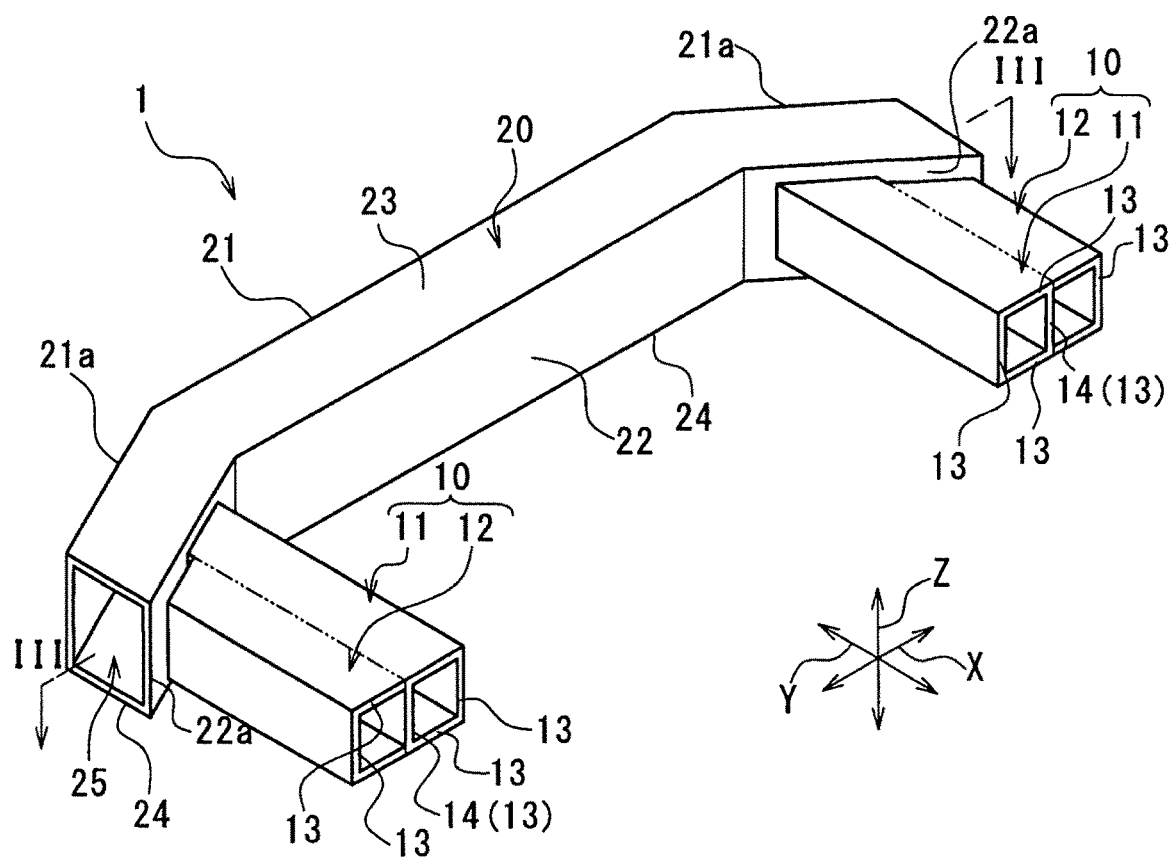
FIG. 2 is a schematic perspective view of the structural member for a vehicle according to the first embodiment.

Referring to FIG. 2, the bumper reinforcement 1 includes two bumper stays 10 and one bumper beam 20.

Figure 3:
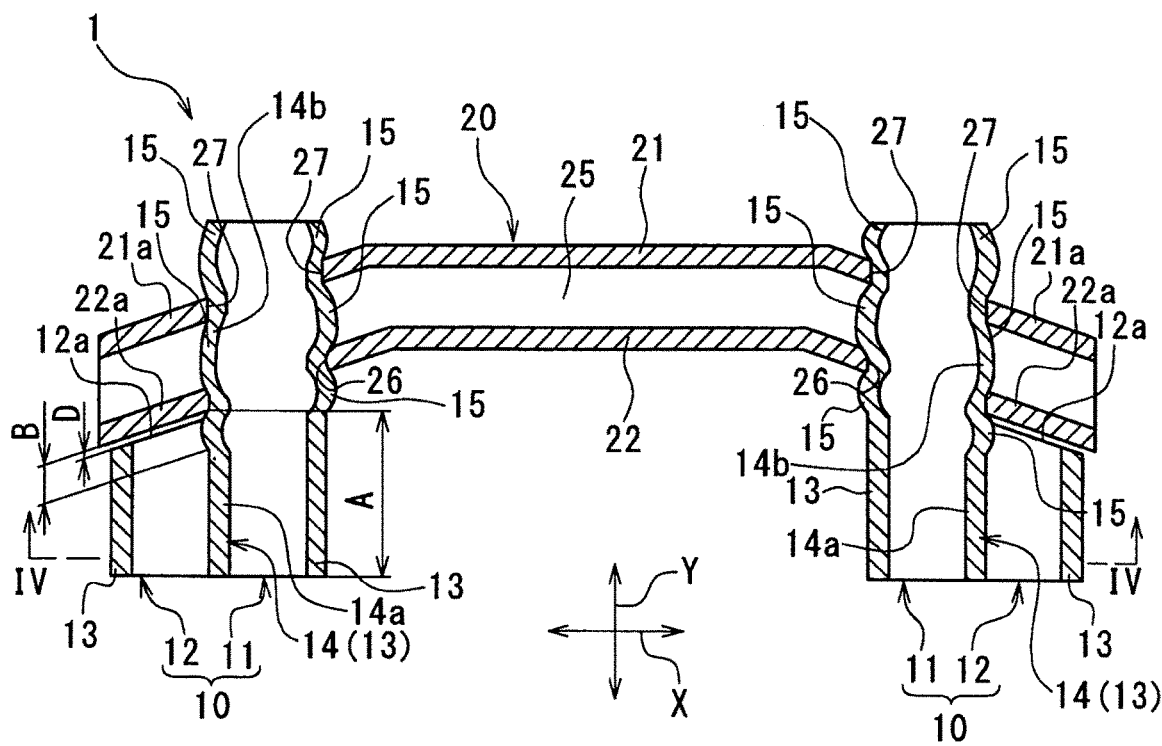
FIG. 3 is a cross-sectional view taken along line III-III in FIG. 2.

Referring also to FIG. 3, the bumper stay 10 has a tubular shape extending in the Y direction. The bumper stay 10 of the present embodiment includes a first shock absorbing portion 11 and a second shock absorbing portion 12 disposed adjacent to an outer side of the first shock absorbing portion 11 in the X direction. The first shock absorbing portion 11 has flat surfaces perpendicular to the Y direction at both ends in the Y direction. Further, the second shock absorbing portion 12 has a flat surface that is inclined rearward in the Y direction toward an outer side in the X direction in an end portion 12a on the front side in the Y direction. The second shock absorbing portion 12 has a flat surface perpendicular to the Y direction in an end portion on the rear side in the Y direction. The bumper stay 10 of the present embodiment is, for example, an extruded material made from an aluminum alloy.

Figure 4:
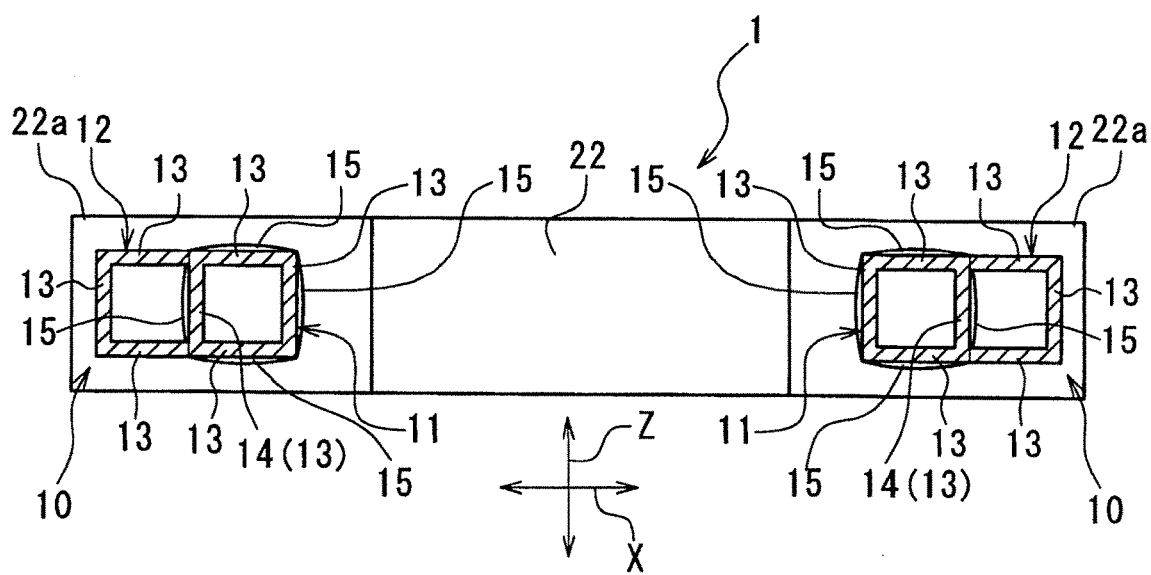
FIG. 4 is a cross-sectional view taken along line IV-IV in FIG. 3.

Referring to FIG. 4, the first shock absorbing portion 11 has a rectangular closed cross-sectional shape in a cross section perpendicular to the Y direction. In the present embodiment, the closed cross-sectional shape of the first shock absorbing portion 11 has a square shape and is composed of four continuous flat walls 13.

The second shock absorbing portion 12 has a rectangular closed cross-sectional shape in a cross section perpendicular to the Y direction. In the present embodiment, the closed cross-sectional shape of the second shock absorbing portion 12 has a square shape and is composed of four continuous flat walls 13.

That is, the cross section of the bumper stay 10 of the present embodiment orthogonal to the Y direction includes a first square portion that constitutes the first shock absorbing portion 11 and a second square portion that is disposed adjacent to the first square portion and constitutes the second shock absorbing portion 12. The first square portion and the second square portion share a partition wall 14, which is one of the walls 13. In other words, the partition wall 14 is part of the first square portion and also part of the second square portion.

Referring to FIG. 3, the partition wall 14 includes a shared portion 14a shared by the first shock absorbing portion 11 and the second shock absorbing portion 12, and a dedicated portion 14b included only in the first shock absorbing portion 11.

Referring to FIG. 3, the bumper stay 10 includes overhanging portions (insertion portion) 15 that projects toward an outer side of the bumper stay 10 on an outer peripheral surface of the first shock absorbing portion 11.

Referring to FIGS. 2 and 3, the bumper beam 20 is disposed on the front side of the bumper stay 10 in the Y direction. The bumper beam 20 includes a front wall 21 disposed on an XZ plane and a rear wall 22 that is disposed on the XZ plane and spaced apart from the front wall 21 on the rear side in the Y direction. Both end portions of the front wall 21 each has a front inclined portion 21a that is inclined to the rear side in the Y direction toward the outer side in the X direction when viewed in the Z direction. Both end portions of the rear wall 22 each has a rear inclined portion 22a that is inclined to the rear side in the Y direction toward the outer side in the X direction when viewed in the Z direction. The bumper beam 20 includes an upper wall 23 and a lower wall 24, which are disposed on a plane (XY plane) perpendicular to the Z direction and mechanically connect an end portion of the front wall 21 and an end portion of the rear wall 22. That is, the bumper beam 20 according to this embodiment includes a space portion 25 surrounded by the front wall 21, the rear wall 22, the upper wall 23, and the lower wall 24. A hole 26 into which the first shock absorbing portion 11 of the bumper stay 10 is inserted is formed in each of the rear inclined portions 22a. The hole 26 has a rectangular shape similar to an outer shape of the first shock absorbing portion 11 of the bumper stay 10, and is formed to be slightly larger than the outer shape of the first shock absorbing portion 11. Similarly, each of the front inclined portions 21a of the bumper beam 20 is provided with a hole 27 having the same shape as and concentric with the hole 26 of the rear inclined portion 22a. Such a bumper beam 20 is made from, for example, high tension steel.

Referring to FIG. 3, the first shock absorbing portion 11 of the bumper stay 10 is inserted into the hole 26 of the rear inclined portion 22a and the hole 27 of the front inclined portion 21a of the bumper beam 20. The first shock absorbing portion 11 of the bumper stay 10 has the overhanging portions 15. The overhanging portions 15 are formed in the space portion 25, front side in the Y direction of the front inclined portion 21a of the bumper beam 20, and rear side in the Y direction of the rear inclined portion 22a of the bumper beam 20. The overhanging portions 15 of the bumper stay 10 is in contact with the bumper beam 20 at the holes 26 and 27 over the entire circumference of the holes.

Further, the end portion 12a on the front side in the Y direction of the second shock absorbing portion 12 of the bumper stay 10 is disposed at a distance D in the Y direction from the rear inclined portion (opposed wall) 22a of the rear wall 22. The distance D is set within a range of 30% or less of a dimension A in the Y direction of the shared portion 14a of the partition wall 14.

Figure 5:
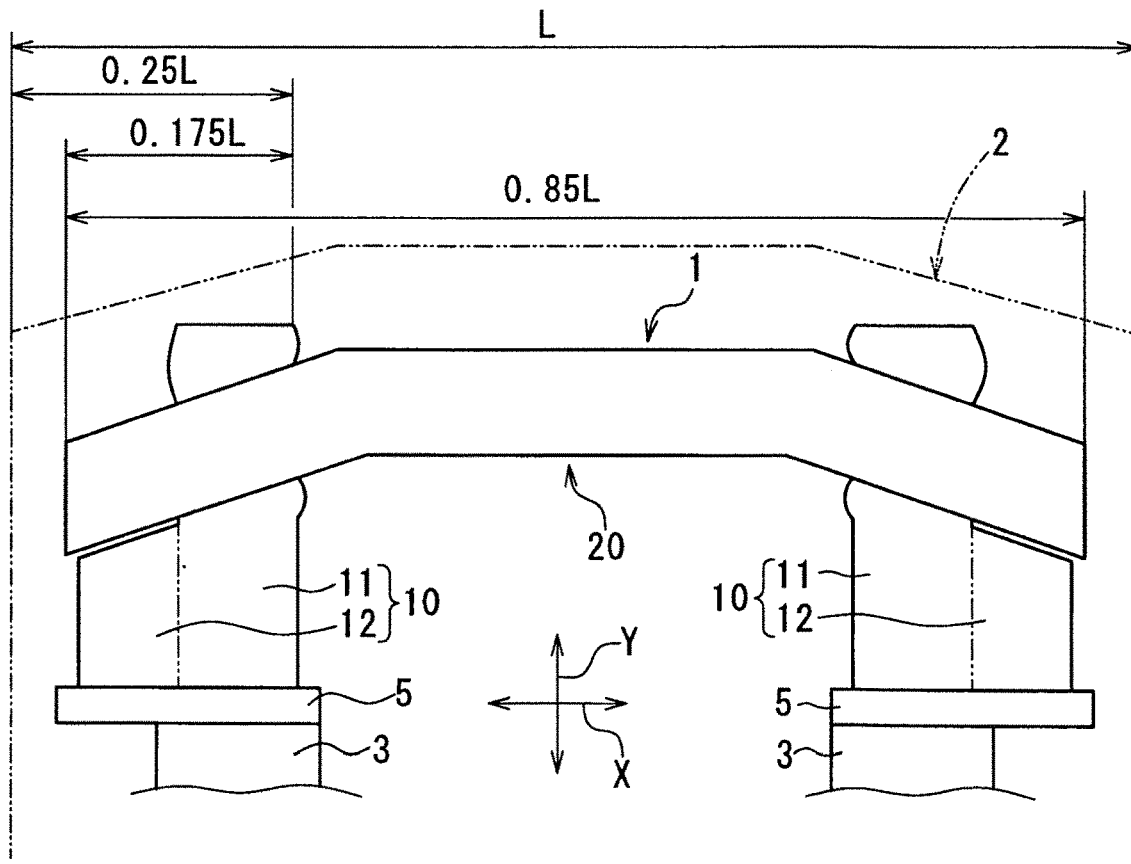
FIG. 5 is a schematic plan view of a vehicle body frame to which the structural member for a vehicle according to the first embodiment is attached.

Referring to FIG. 5, a connecting plate 5 is attached to a rear end portion in the Y direction of the bumper stay 10. The bumper stay 10 is fixed to the front side member 3 with a connecting plate 5 interposed between them. Specifically, the first shock absorbing portion 11 of the bumper stay 10 is fixed to the front in the Y direction of the front side member 3. Further, the second shock absorbing portion 12 of the bumper stay 10 extends outward in the X direction with respect to the front side member 3. As shown in FIG. 5, the dimension in the X direction of the bumper beam 20 of the present embodiment is 85% of a vehicle width L of the automobile 2. The dimension in the X direction of the bumper stay 10 is 17.5% of the vehicle width L of the automobile 2.

A method of forming the bumper reinforcement 1 of the present embodiment will be described with reference to FIGS. 6 to 8.

Figure 6:
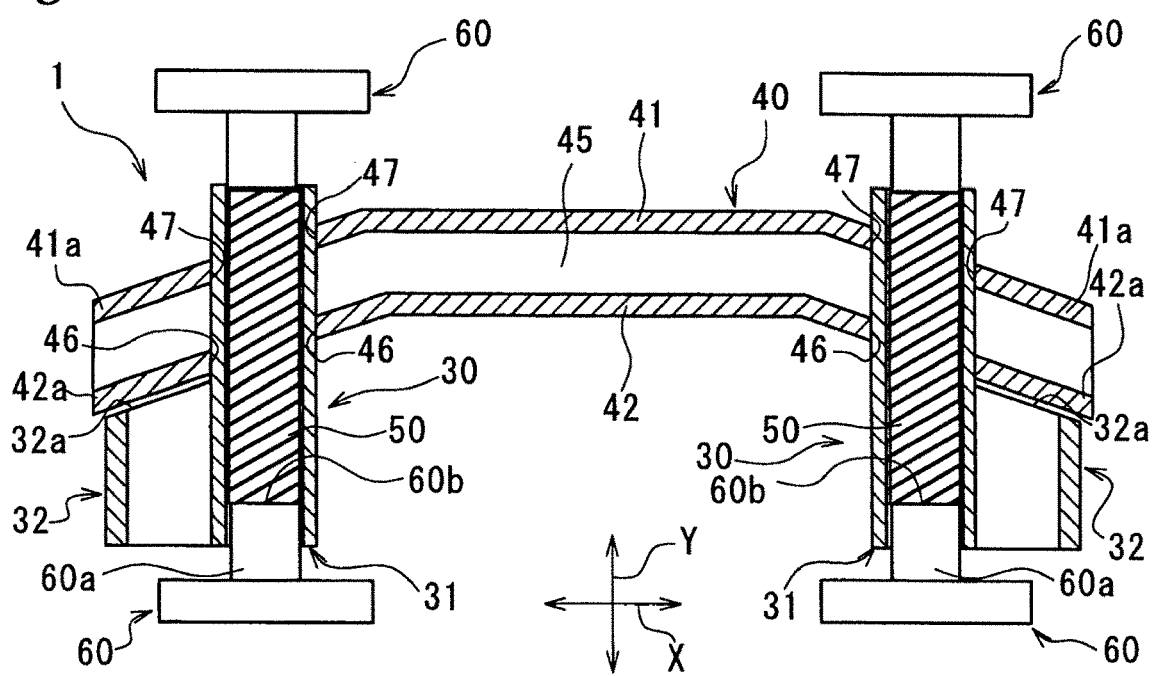
FIG. 6 is a cross-sectional view similar to FIG. 3 of a first step of joining members according to the first embodiment.

As shown in FIG. 6, a first structural member 30 is used to form the bumper stay 10. Further, a second structural member 40 is used to form the bumper beam 20. For joining the first structural member 30 and the second structural member 40, a rubber 50 (elastic body) inserted inside the first structural member 30 and a pusher 60 for compressing the rubber 50 are used.

The first structural member 30 includes, on the XZ plane, a first shock absorbing portion 31 with an outer shape having a rectangular closed cross-sectional shape and a second shock absorbing portion 32 adjacent to the first shock absorbing portion 31 on the outer side in the X direction.

The second structural member 40 includes a front wall disposed on the XZ plane and a rear wall 42 that is disposed on the XZ plane and spaced apart from the front wall 41 on the rear side in the Y direction. Both end portions of the front wall 41 each has a front inclined portion 41a that is inclined to the rear side in the Y direction toward the outer side of the vehicle when viewed in the Z direction. Both end portions of the rear wall 42 each has a rear inclined portion 42a that is inclined to the rear side in the Y direction toward the outer side of the vehicle when viewed in the Z direction. The second structural member 40 includes an upper wall and a lower wall (not shown), which are disposed on the XY plane and mechanically connect an end portion of the front wall 41 and an end portion of the rear wall 42. That is, the second structural member 40 according to the present embodiment includes the space portion 45 surrounded by the front wall 41, the rear wall 42, the upper wall, and the lower wall. A hole 46 into which the first shock absorbing portion 31 of the first structural member 30 is inserted is formed in each of the rear inclined portions 42a. Similarly, a hole 47 into which the first shock absorbing portion 31 of the first structural member 30 is inserted is formed in each of the front inclined portions 41a. The hole 46 has a rectangular shape similar to an outer shape of the first shock absorbing portion 31 of the first structural member 30, and is formed to be slightly larger than the outer shape of the first shock absorbing portion 31. Similarly, the hole 47 has a rectangular shape similar to an outer shape of the first shock absorbing portion 31 of the first structural member 30, and is formed to be slightly larger than the outer shape of the first shock absorbing portion 31.

The rubber 50 has a quadrangular prism shape extending in the Y direction. An outer shape of the rubber 50 is formed to be slightly smaller than an inner shape of the first structural member 30 so that the rubber 50 can be inserted into the first structural member 30. Both ends of the rubber 50 have a flat surface perpendicular to a longitudinal direction of the rubber 50. As a material of the rubber 50, for example, any of urethane rubber, chloroprene rubber, CNR rubber (chloroprene rubber+nitrile rubber), and silicon rubber is preferably used. Further, the hardness of the rubber 50 is preferably 30 or more in Shore A.

The pusher 60 is attached to a press device (not shown) or the like, and can compress the rubber 50 in the Y direction by being driven by this press device. The pusher 60 has a protruding portion 60a. The protruding portion 60a is a portion that presses the rubber 50. A pressing surface 60b, which is an end surface of the protruding portion 60a, has a flat surface that corresponds to the shape of the rubber 50 and is perpendicular to the longitudinal direction of the rubber 50.

First, as shown in FIG. 6, the first shock absorbing portion 31 of the first structural member 30 is inserted into the hole 46 provided in the rear inclined portion 42a, and then is inserted into the hole 47 provided in the front inclined portion 41a. At this time, the second shock absorbing portion 32 of the first structural member 30 is disposed with space in the Y direction from the rear inclined portion 42a of the second structural member 40. Then, the rubber 50 is inserted into the inside of the first structural member 30.

Figure 7:
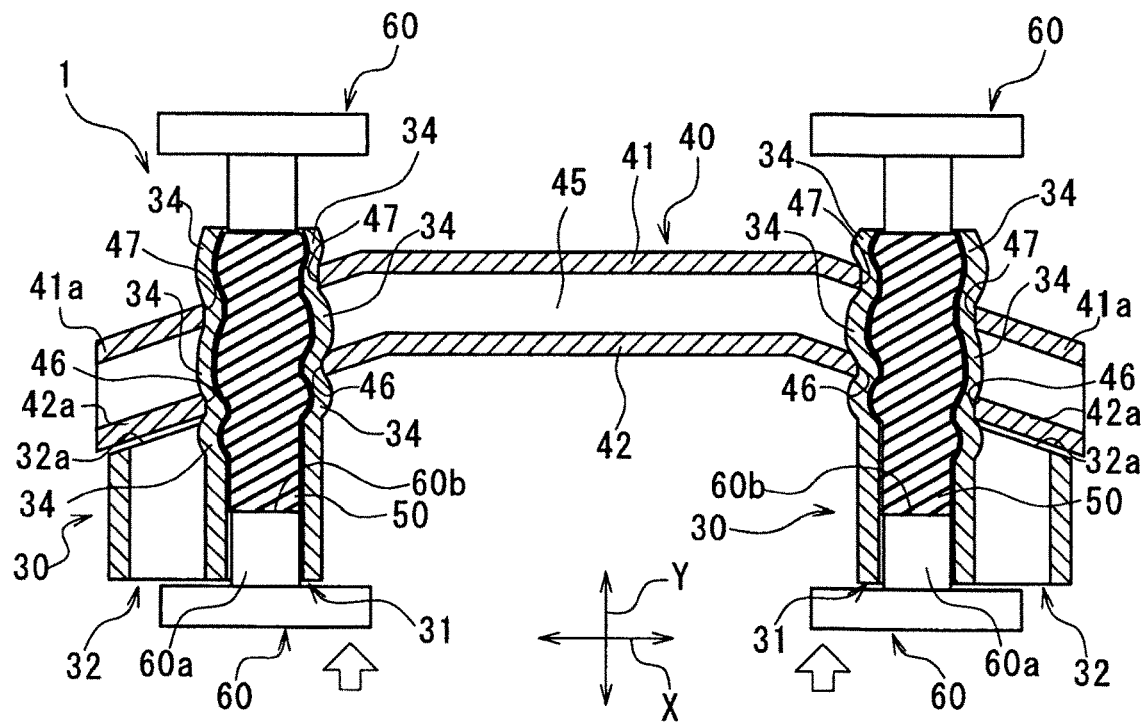
FIG. 7 is a cross-sectional view similar to FIG. 3 of a second step of joining members according to the first embodiment.

Next, as shown in FIG. 7, the protruding portion 60a of the pusher 60 is inserted into the first shock absorbing portion 31 of the first structural member 30, and the rubber is compressed in the Y direction to be swelled in a direction orthogonal to the compressing direction, so that the first shock absorbing portion 31 of the first structural member 30 is expanded. The first structural member 30 is caulk-joined to the second structural member 40 by this expansion. The first shock absorbing portion 31 of the first structural member 30 has overhanging portions 34. The overhanging portions 34 are formed in the space portion 45 of the second structural member 40, front side in the Y direction of the front inclined portion 41a of the second structural member 40, and rear side in the Y direction of the rear inclined portion 42a of the second structural member 40.

Figure 8:
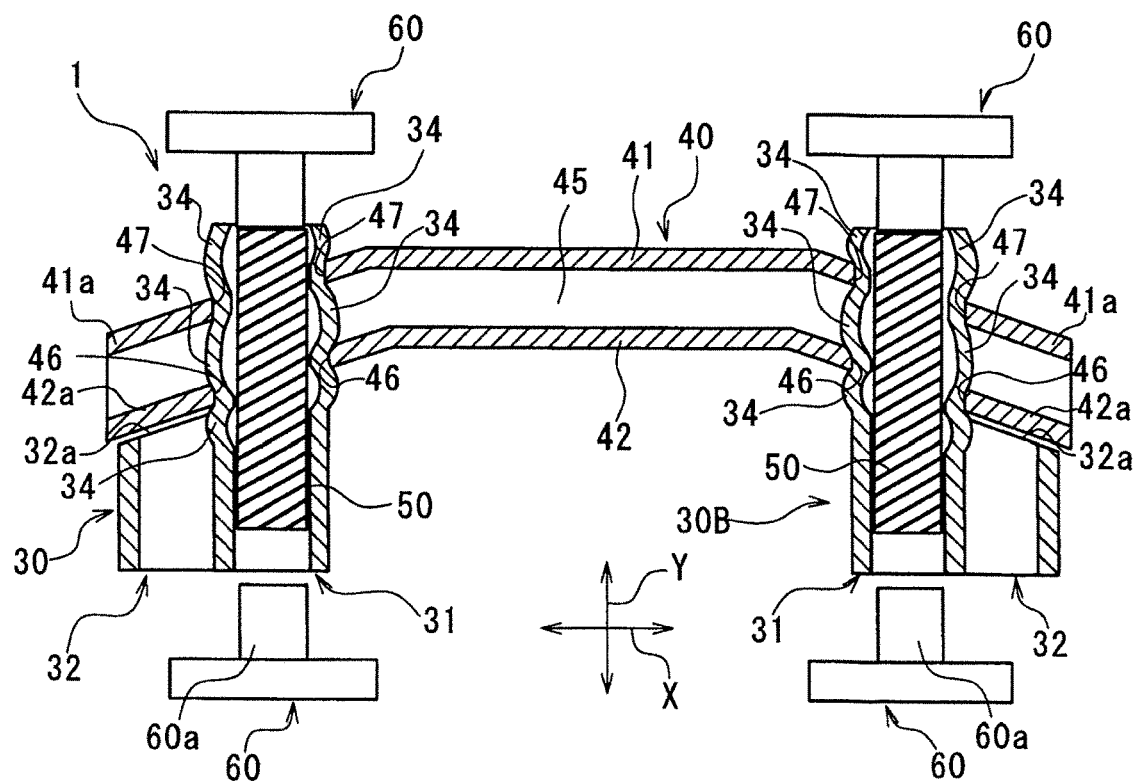
FIG. 8 is a cross-sectional view similar to FIG. 3 of a third step of joining members according to the first embodiment.

After caulk-joining, as shown in FIG. 8, the compression by the pusher 60 is released. The rubber 50 from which the compressive force is removed restores its original shape by its own elastic force. For this reason, the rubber 50 can be easily removed from the first structural member 30.

The bumper reinforcement 1 of the present embodiment has a feature described below.

Since the second shock absorbing portion 12 is provided adjacent to an outer side in the X direction of the first shock absorbing portion 31, the first shock absorbing portion 11 of the bumper stay 10 as well as the second shock absorbing portion 12 collapse in the Y direction at the time of a small overlap collision of the automobile 2. For this reason, the energy absorption efficiency at the time of a small overlap collision of the bumper reinforcement 1 can be improved. Further, the bumper beam 20 and the bumper stay 10 are joined by expansion of the bumper stay 10. That is, since welding is not required to join the bumper beam 20 and the bumper stay 10, the reliability of the bumper reinforcement 1 is not reduced.

The first shock absorbing portion 11 of the bumper stay 10 is fixed to the front side member 3, and the second shock absorbing portion 12 is disposed on an outer side in the X direction of the front side member 3. For this reason, regardless of a mounting position of the bumper stay 10 on the front side member 3, the second shock absorbing portion 12 can increase an absorption amount of impact energy at the time of a small overlap collision. Further, even in a case where the dimension in the X direction of the bumper beam 20 is increased, the impact energy of a section from an outer end portion in the X direction of the bumper beam 20 to the first shock absorbing portion 11 of the bumper stay 10 is absorbed by the second shock absorbing portion 12 of the bumper stay 10, so that the bumper reinforcement 1 does not fall sideways at the time of a small overlap collision.

The first shock absorbing portion 11 of the bumper stay 10 has a closed cross-sectional shape in a cross section perpendicular to the Y direction. For this reason, as compared with a case where the first shock absorbing portion 11 of the bumper stay 10 has an open cross-sectional shape in the cross section perpendicular to the Y direction, a bonding force between the bumper stay 10 and the bumper beam 20 can be improved. Further, the second shock absorbing portion 12 of the bumper stay 10 has a closed cross-sectional shape in a cross section perpendicular to the Y direction. For this reason, as compared with a case where the second shock absorbing portion 12 of the bumper stay 10 has an open cross section in the cross section perpendicular to the Y direction, a cross-sectional area of the entire bumper stay 10 can be made large, and an absorption amount of impact energy can be increased.

The end portion 12a on the front side in the Y direction of the second shock absorbing portion 12 of the bumper stay 10 is disposed at the distance D in the Y direction from the rear inclined portion 22a of the bumper beam 20. For this reason, at the time of a small overlap collision, the first shock absorbing portion 11 is axially collapsed, and then the second shock absorbing portion 12 is axially collapsed. That is, since the impact at the time of a small overlap collision can be absorbed in a stepwise manner, an initial load acting on the bumper stay 10 can be prevented from rising significantly at an initial stage of the collision.

The wider the distance D, the less the interference between the overhanging portion 15 and the second shock absorbing portion 12 when the first shock absorbing portion 11 is expanded and joined. Accordingly, the joint strength between the bumper stay 10 and the bumper beam 20 can be improved. Generally, a dimension B (see FIG. 3) in the Y direction of the overhanging portion 15 formed on the shared portion 14a of the partition wall 14 is about 30% of the dimension A in the Y direction of the shared portion 14a of the partition portion 14. On the other hand, in a case where the distance D is larger than necessary, the absorption amount of impact energy of the bumper stay 10 as a whole decreases. In the present embodiment, the distance D in the Y direction between the end portion 12a on the front side of the second shock absorbing portion 12 of the bumper stay 10 and the rear inclined portion 22a of the bumper beam 20 is defined as the above-described appropriate range (30% or less of the dimension A in the Y direction of the shared portion 14a of the partition wall 14). For this reason, the joint strength between the bumper stay 10 and the bumper beam 20 can be improved while a decrease in the absorption amount of impact energy of the bumper stay 10 as a whole is suppressed.

Further, the dimension in the X direction of the bumper beam 20 in the present embodiment is 85% of the vehicle width L of the automobile 2, and the dimension in the X direction of the bumper stay 10 is 17.5% of the vehicle width L of the automobile 2. For this reason, for example, in a case where an overlap collision of 25% of the vehicle width L (shown in FIG. 5) is applied to the automobile 2, the bumper stay 10 can absorb impact of an area of 70% of the collision area in the X direction.

Hereinafter, variations of the bumper reinforcement 1 according to the present embodiment will be described with reference to FIGS. 9 to 13.

Figure 9:
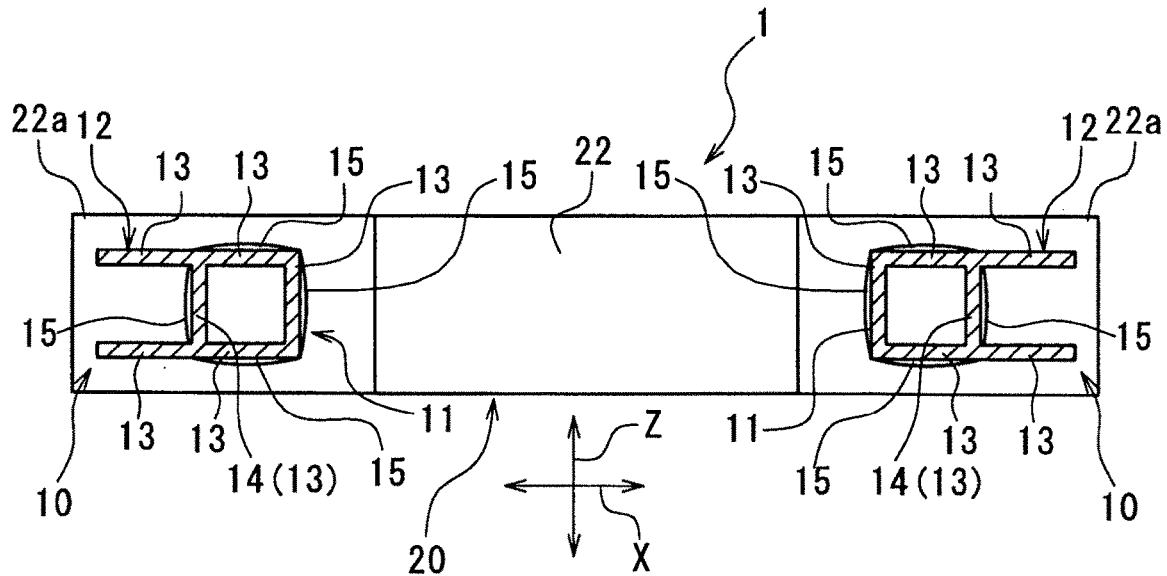
FIG. 9 is a cross-sectional view similar to FIG. 4 of a structural member for a vehicle according to a variation of the first embodiment.

In the variation shown in FIG. 9, the second shock absorbing portion 12 forms an open cross-sectional shape in a cross section perpendicular to the Y direction.

Figure 10:
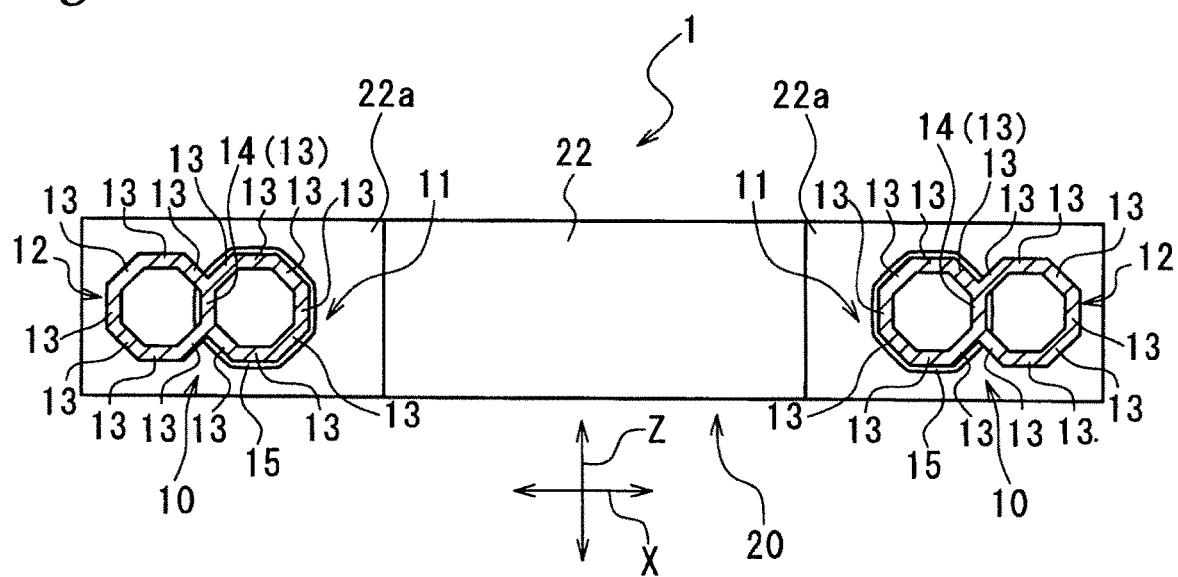
FIG. 10 is a cross-sectional view similar to FIG. 4 of the structural member for a vehicle according to a variation of the first embodiment.

In the variation shown in FIG. 10, the bumper stay 10 has a closed cross-sectional shape in which two identical octagons share the partition wall 14 in a cross section perpendicular to the Y direction. The cross section of the bumper stay 10 of the present embodiment orthogonal to the Y direction includes a first octagonal portion that constitutes the first shock absorbing portion 11 and a second octagonal portion that is disposed adjacent to the first octagonal portion and constitutes the second shock absorbing portion 12. The first octagonal portion and the second octagonal portion share the partition wall 14, which is one of the walls 13. In other words, the partition wall 14 is part of the first octagonal portion and also part of the second octagonal portion.

Figure 11:
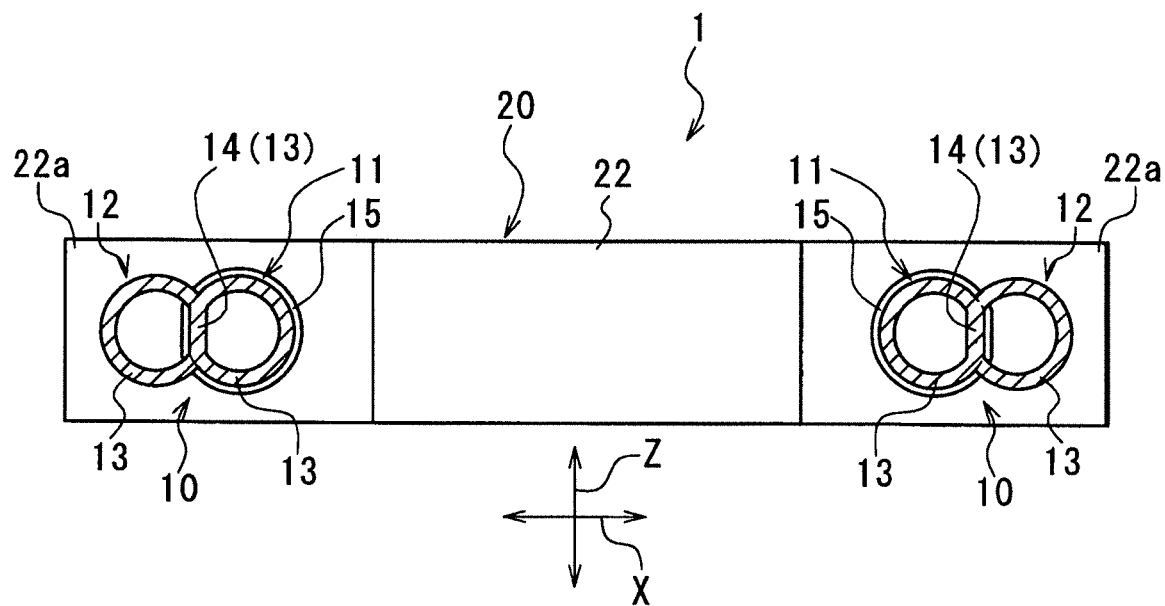
FIG. 11 is a cross-sectional view similar to FIG. 4 of the structural member for a vehicle according to a variation of the first embodiment.

In the variation shown in FIG. 11, the bumper stay 10 has a closed cross-sectional shape in which two identical arcs share the partition wall 14 in a cross section perpendicular to the Y direction. The cross section of the bumper stay 10 of the present embodiment orthogonal to the Y direction includes a first arc-shaped portion that constitutes the first shock absorbing portion 11 and a second arc-shaped portion that is disposed adjacent to the first arc-shaped portion and constitutes the second shock absorbing portion 12. The first arc-shaped portion and the second arc-shaped portion share the partition wall 14, which is one of the walls 13. In other words, the partition wall 14 is part of the first arc-shaped portion and also part of the second arc-shaped portion.

Figure 12:
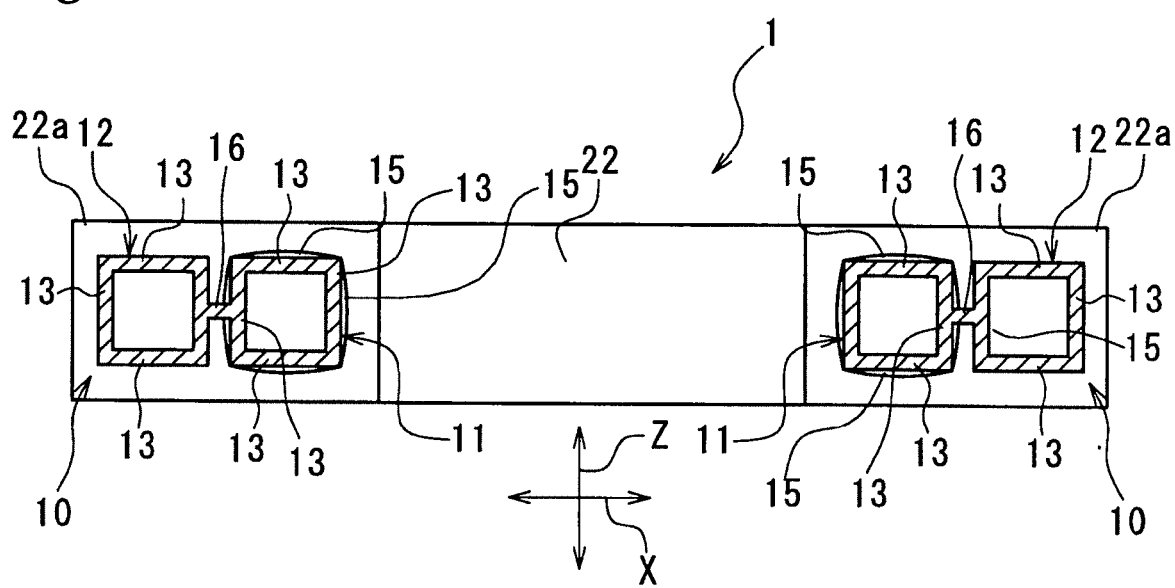
FIG. 12 is a cross-sectional view similar to FIG. 4 of the structural member for a vehicle according to a variation of the first embodiment.

In the variation shown in FIG. 12, the bumper stay 10 includes a connecting wall 16 that connects the first shock absorbing portion 11 and the second shock absorbing portion 12 in a cross section perpendicular to the Y direction.

Figure 13:
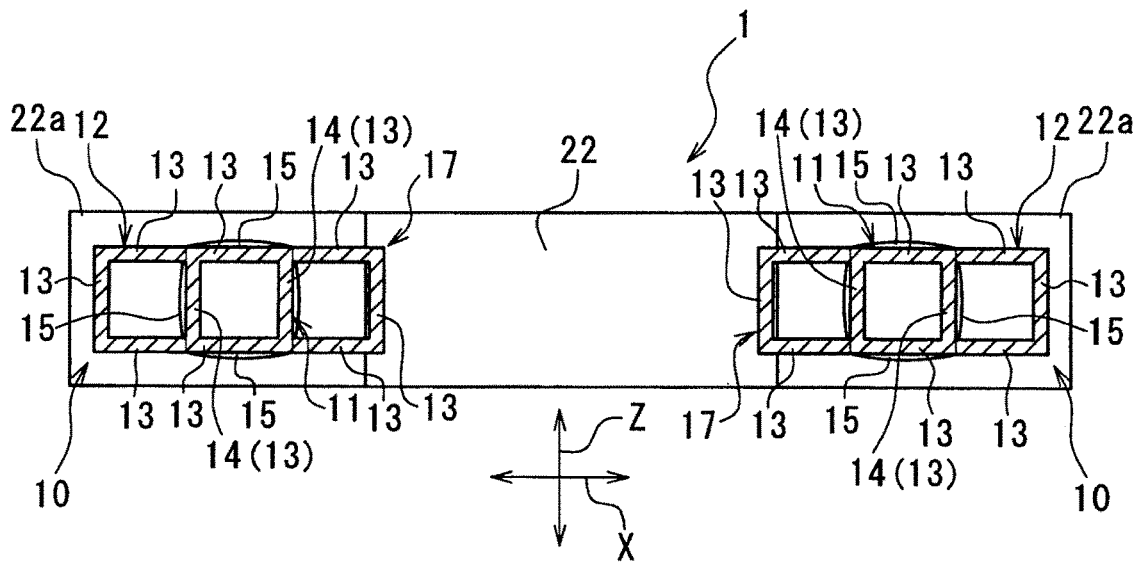
FIG. 13 is a cross-sectional view similar to FIG. 4 of the structural member for a vehicle according to a variation of the first embodiment.

In the variation shown in FIG. 13, the bumper stay 10 further includes a third shock absorbing portion 17 that shares the partition wall 14 with the first shock absorbing portion 11 in a cross section perpendicular to the Y direction. The third shock absorbing portion 17 is composed of four of the continuous flat walls 13.

In second and third embodiments described below, the same or similar elements as those in the first embodiment are attached with the same reference numerals, and are omitted from detailed description. Furthermore, in these embodiments, similar actions and effects as those of the first embodiment are achieved, except for a point particularly mentioned.

Second Embodiment

Figure 14:
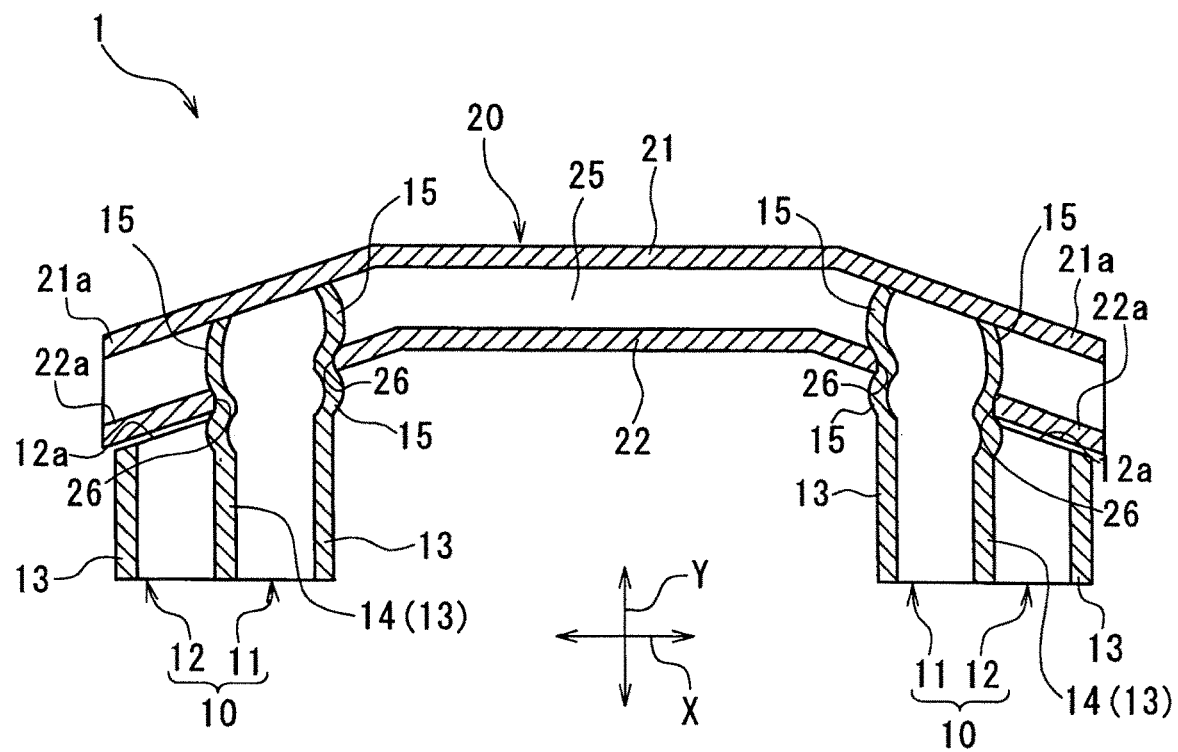
FIG. 14 is a cross-sectional view similar to FIG. 3 of the structural member for a vehicle according to a second embodiment of the present invention.

Referring to FIG. 14, the first shock absorbing portion 11 of the present embodiment is configured so as to conform to a shape of the bumper beam 20 at a front end point in the Y direction. The first shock absorbing portion 11 of the bumper stay 10 has the overhanging portion 15 formed in the space portion 25 and on the rear side in the Y direction of the rear inclined portion 22a of the bumper beam 20.

Third Embodiment

Figure 15:
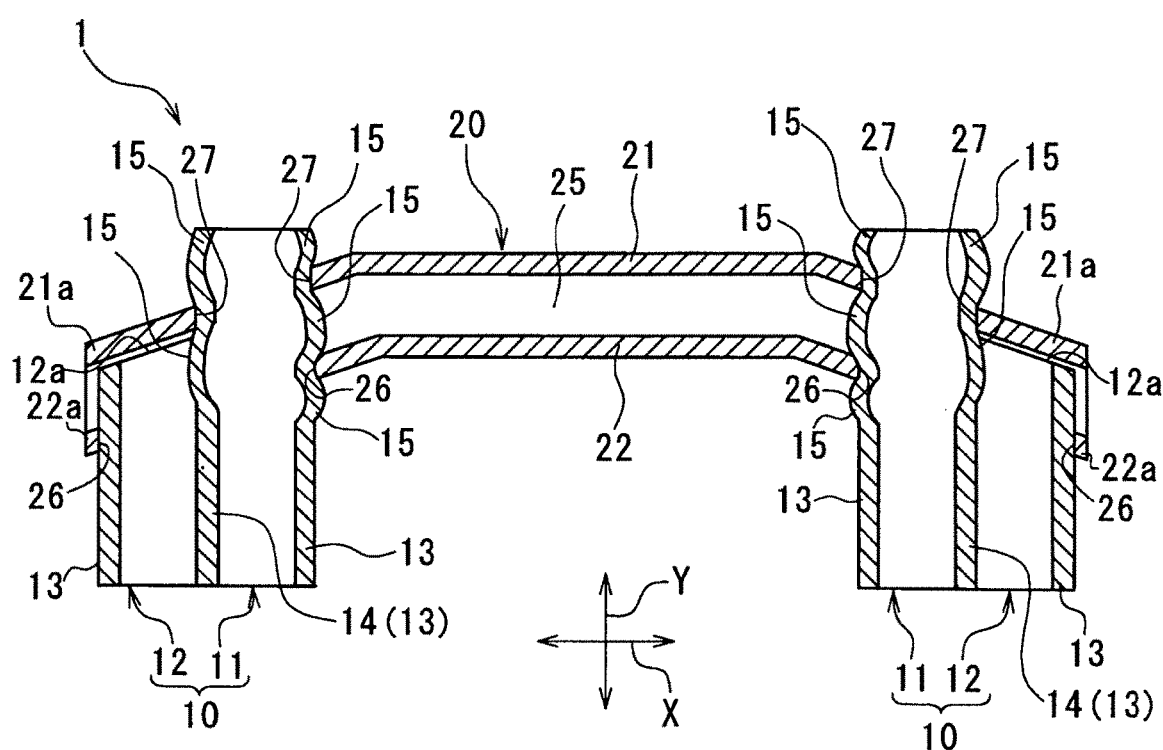
FIG. 15 is a cross-sectional view similar to FIG. 3 of the structural member for a vehicle according to a third embodiment of the present invention.

Referring to FIG. 15, the hole 26 of the rear inclined portion 22a of the bumper beam 20 of the present embodiment has a rectangular shape similar to an outer shape of the bumper stay 10, and is formed to be slightly larger than an outer shape of the bumper stay 10. In the present embodiment, in addition to the first shock absorbing portion 11 of the bumper stay 10, the second shock absorbing portion 12 is inserted in the hole 26.

Further, the end portion 12a on the front side in the Y direction of the second shock absorbing portion 12 of the bumper stay 10 is disposed at a distance in the Y direction from the front inclined portion (opposed wall) 21a of the front wall 21.

Although the present invention has been described above with reference to the preferred embodiments, the present invention is not limited to a specific embodiment, and various changes may be made within the scope of the gist of the present invention described in claims.

For example, the end portion 12a on the front side in the Y direction of the second shock absorbing portion 12 of the bumper stay 10 may abut on the front inclined portion 21a or the rear inclined portion 22a of the bumper beam 20.

Further, the first shock absorbing portion 11 and the second shock absorbing portion 12 of the bumper stay may be formed separately.

What is claimed is:

1. A structural member for a vehicle comprising:
   bumper stays having a tubular configuration and fixed to each of front ends of a pair of front side members of the vehicle; and
   a tubular bumper beam provided with holes to which the bumper stays are inserted,
   wherein each of the bumper stays comprises:
   a first shock absorbing portion having an insertion portion joined to the bumper beam at one of the holes in an expanded state; and
   a second shock absorbing portion extending in the same direction as the first shock absorbing portion and provided outwardly and adjacently with respect to the first shock absorbing portion;
   wherein each of the first shock absorbing portion and the second shock absorbing portion of each of the bumper stays has a closed cross section shape in a cross section orthogonal to a direction in which the bumper stay extends; and
   wherein for each of the bumper stays the closed cross section shape of the first shock absorbing portion is substantially the same size as the closed cross section shape of the second shock absorbing portion.

2. The structural member for vehicle according to claim 1, wherein the first shock absorbing portion is fixed to the front side member, and
   wherein the second shock absorbing portion of the bumper stay extends outwardly with respect to the front side member.

3. The structural member for vehicle according to claim 1, wherein a cross section of the bumper stay orthogonal to a direction in which the bumper stay extends comprising:
   a first octagonal portion; and
   a second octagonal portion disposed adjacent to the first octagonal portion, and
   wherein the first octagonal portion and the second octagonal portion share one partition wall.

4. The structural member for vehicle according claim 1, wherein the bumper beam comprising an opposed wall opposite to an end portion of the second absorbing portion in a direction in which the bumper stay extends, and
   wherein the end portion of the second absorbing portion and the opposed wall of the bumper beam are disposed at an interval in a direction in which the bumper stay extends.

5. The structural member for vehicle according claim 1, wherein a dimension of the bumper beam in a vehicle width direction is larger than 85% of a vehicle width of the vehicle, and
   wherein a dimension of the bumper stay in the vehicle width direction is larger than 17.5% of the vehicle width of the vehicle.

* * * * *